(12) United States Patent
Nagata et al.

(10) Patent No.: US 8,038,976 B2
(45) Date of Patent: Oct. 18, 2011

(54) METHOD AND SYSTEM FOR PRODUCING ACTIVATED CARBON

(75) Inventors: Masayoshi Nagata, Kanagawa (JP); Ryou Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

(21) Appl. No.: 12/324,957

(22) Filed: Nov. 28, 2008

(65) Prior Publication Data

US 2009/0142253 A1 Jun. 4, 2009

(30) Foreign Application Priority Data

Nov. 30, 2007 (JP) .................................. 2007-309671

(51) Int. Cl.
| | |
|---|---|
| *B29D 7/00* | (2006.01) |
| *C01B 31/08* | (2006.01) |
| *C01B 31/00* | (2006.01) |
| *D01F 9/16* | (2006.01) |

(52) U.S. Cl. ................. 423/447.9; 423/445 R; 264/217; 502/416

(58) Field of Classification Search ........................ None
See application file for complete search history.

(56) References Cited

U.S. PATENT DOCUMENTS

| | | | |
|---|---|---|---|
| 4,104,129 A * | 8/1978 | Fields et al. ..................... | 201/17 |
| 2010/0015395 A1 * | 1/2010 | Otoshi et al. .................. | 428/141 |

FOREIGN PATENT DOCUMENTS

| | | |
|---|---|---|
| JP | 07-172808 | 7/1995 |
| JP | 11-171524 | 6/1999 |
| WO | WO 2008090938 A1 * | 7/2008 |

* cited by examiner

*Primary Examiner* — Melvin Mayes
*Assistant Examiner* — Guinever Gregorio
(74) *Attorney, Agent, or Firm* — Sughrue Mion, PLLC

(57) ABSTRACT

An activated carbon producing system includes a heating furnace for thermally decomposing multi-layer film including a polyvinyl alcohol layer and cellulose triacetate (TAC) layers formed on surfaces of the polyvinyl alcohol layer, to produce carbonized material by carbonization. An activation device activates the carbonized material with heat, to produce activated carbon by forming fine pores therein. A burner assembly combusts acetic acid contained in pyrolysis gas created by thermal decomposition in the heating furnace, to produce gaseous carbon dioxide. A first heat exchanger exchanges heat between the pyrolysis gas from the burner assembly and heat exchange medium, to provide the heating furnace with the heat of the heat exchange medium. A washer absorbs gaseous carbon dioxide contained in the pyrolysis gas from the first heat exchanger by use of alkaline absorption solution. If the multi-layer film contains additive, the washer washes away the combusted additive.

7 Claims, 5 Drawing Sheets

METHOD AND SYSTEM FOR PRODUCING ACTIVATED CARBON

BACKGROUND OF THE INVENTION

1. Field of the Invention

The present invention relates to a method and system for producing activated carbon. More particularly, the present invention relates to a method and system for producing activated carbon, in which cellulose acylate can be utilized as raw material, and the activated carbon can be produced with economized heat energy.

2. Description Related to the Prior Art

Polymer films have excellent optical transmittance and flexibility and are capable of forming thin and lightweight films. Owing to this, the polymer films are widely used as optical functional films. In particular, a cellulose acylate film formed of cellulose acylate and the like has toughness and low birefringence in addition to those properties. The film is used as a support of photo film or photosensitive material, and a protection film for a polarizing filter incorporated in a panel, namely, a liquid crystal display (LCD) whose market is recently expanding.

In a polarizing filter production process to produce polarizing filters, approximately 30% of the total amount of supplied films is discarded. The discarded films or waste films are rapidly increasing in accordance with rapid market expansion of the polarizing filters. However, reuse and recycle systems have not been developed for the waste films in comparison with a reuse system of wastepaper and a recycle resin forming system of waste plastics. Waste films are burned or disposed of in landfills at additional waste-processing expense.

However, reuse of the waste films has not been known with the viewpoint of recent environmental problems and saving of resources.

To reuse waste materials, their recycling as raw materials for newly producing film is conceived. Separation or isolation of cellulose acylates and polyvinyl alcohol from waste films is required. Furthermore, various additives are contained in waste materials of polarizing filters, as those must be contained polymer films as initial form of polarizing filters. It is extremely difficult to isolate the cellulose acylates and polyvinyl alcohol, namely, to recover the cellulose acylates and polyvinyl alcohol selectively by removing additives from the waste films in the mixture. The cellulose acylates and polyvinyl alcohol will be unrecoverable as material for new films.

Paper, wood, and thermoset resins such as phenol resin become porous without liquefaction upon application of heat. JP-A 11-171524 discloses a method which reuses wastepaper such as old newspaper and the like as a raw material of activated carbon. JP-A 7-172808 discloses a method which reuses phenol resin-based wastes as raw materials of activated carbon. There is a known process of decomposing cellulose acylate by application of heat.

However, in many cases, carbonized materials generated by carbonization of waste materials do not have high absorptivity due to the above reasons. Accordingly, carbonized materials are used not as adsorbents, but mainly as soil improvement agents, fuels or the like.

According to the conventional knowledge, the thermoplastic resin does not become porous characteristically in carbonization, because of thermal decomposition with heat. Although it is well-known that cellulose acylate as thermoplastic resin decomposes when heated, a reaction mechanism of its carbonization has not been essentially found. There is no known method of producing activated carbon from waste material of polarizing filters which have increased industrially. Saving of heat energy is an important focus because heat energy of a very great amount is required for producing activated carbon.

SUMMARY OF THE INVENTION

In view of the foregoing problems, an object of the present invention is to provide a method and system for producing activated carbon, in which cellulose acylate can be utilized as raw material, and the activated carbon can be produced with economized heat energy.

In order to achieve the above and other objects and advantages of this invention, an activated carbon producing method includes a carbonizing step of thermally decomposing multi-layer film including a polyvinyl alcohol layer and cellulose acylate layers formed on surfaces of the polyvinyl alcohol layer in a heating furnace, to produce carbonized material. In an activating step, the carbonized material is activated with heat, to produce activated carbon by forming fine pores therein. In a combustion step, carboxylic acid contained in pyrolysis gas created by thermal decomposition in the heating furnace is combusted, to produce gaseous carbon dioxide. In a first heat exchange step, heat is exchanged between the pyrolysis gas from the combustion step and heat exchange medium, to provide the heating furnace with the heat of the heat exchange medium. In a gas washing step, the gaseous carbon dioxide contained in the pyrolysis gas from the first heat exchange step is absorbed by use of alkaline absorption solution.

The multi-layer film is waste material created in producing a polarizing plate.

Furthermore, in a second heat exchange step, heat is exchanged between the pyrolysis gas from the gas washing step and heat exchange medium, to provide the heating furnace with the heat of the heat exchange medium.

Furthermore, in a pulverizing step, the carbonized material from the carbonizing step is pulverized, to supply granules having a diameter equal to or more than 2 mm and equal to or less than 20 mm. In a size classifying step, the granules are classified in size classification for supply to the activating step.

Furthermore, in a pulverizing step of pulverizing the carbonized material from the carbonizing step, to supply the activating step with granules having a diameter equal to or more than 2 mm and equal to or less than 20 mm. In a granulation step, granules are formed with a greater diameter by use of the granules from the activating step.

Furthermore, the multi-layer film is cut for supply to the heating furnace, to form chips.

Temperature of the heating furnace is equal to or higher than 300 deg. C. and equal to or lower than 600 deg. C.

Also, an activated carbon producing system is provided, and includes a heating furnace for thermally decomposing multi-layer film including a polyvinyl alcohol layer and cellulose acylate layers formed on surfaces of the polyvinyl alcohol layer, to produce carbonized material by carbonization. An activation device activates the carbonized material with heat, to produce activated carbon by forming fine pores therein. A burner assembly combusts carboxylic acid contained in pyrolysis gas created by thermal decomposition in the heating furnace, to produce gaseous carbon dioxide. A first heat exchanger exchanges heat between the pyrolysis gas from the burner assembly and heat exchange medium, to provide the heating furnace with the heat of the heat exchange medium. A washer absorbs gaseous carbon dioxide contained in the pyrolysis gas from the first heat exchanger by use of alkaline absorption solution.

Furthermore, a second heat exchanger exchanges heat between the pyrolysis gas from the washer and heat exchange medium, to provide the heating furnace with the heat of the heat exchange medium.

Furthermore, a pulverizer pulverizes the carbonized material from the heating furnace, to supply the activation device with granules having a diameter equal to or more than 2 mm and equal to or less than 20 mm.

In another aspect of the invention, an activated carbon producing system includes a heating furnace for thermally decomposing cellulose acylate film, to produce carbonized material by carbonization. An activation device activates the carbonized material with heat, to produce activated carbon by forming fine pores therein. A burner assembly combusts carboxylic acid contained in pyrolysis gas created by thermal decomposition in the heating furnace, to produce gaseous carbon dioxide. A first heat exchanger exchanges heat between the pyrolysis gas from the burner assembly and heat exchange medium, to provide the heating furnace with the heat of the heat exchange medium. A washer absorbs the gaseous carbon dioxide contained in the pyrolysis gas from the first heat exchanger by use of alkaline absorption solution. If the cellulose acylate film contains additive, the burner assembly combusts the additive, and the washer washes away the combusted additive.

Consequently, cellulose acylate can be utilized as raw material in the method and system for producing activated carbon. The activated carbon can be produced with economized heat energy, because the heat exchange is carried out to cool the pyrolysis gas and to supply the heating furnace additionally with surplus heat energy removed from the pyrolysis gas.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1A:
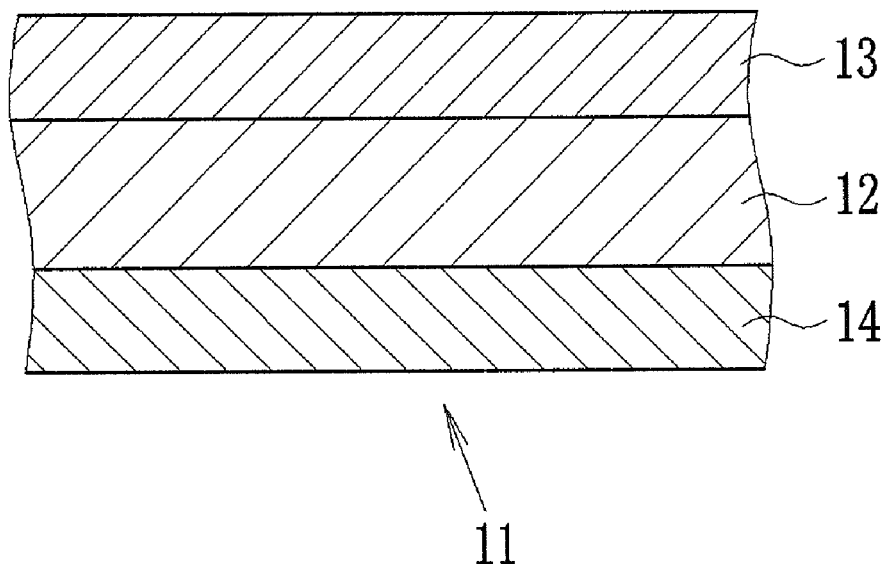
FIG. 1A is a cross section illustrating a multi-layer waste film as carbonaceous raw material.
Figure 1B:
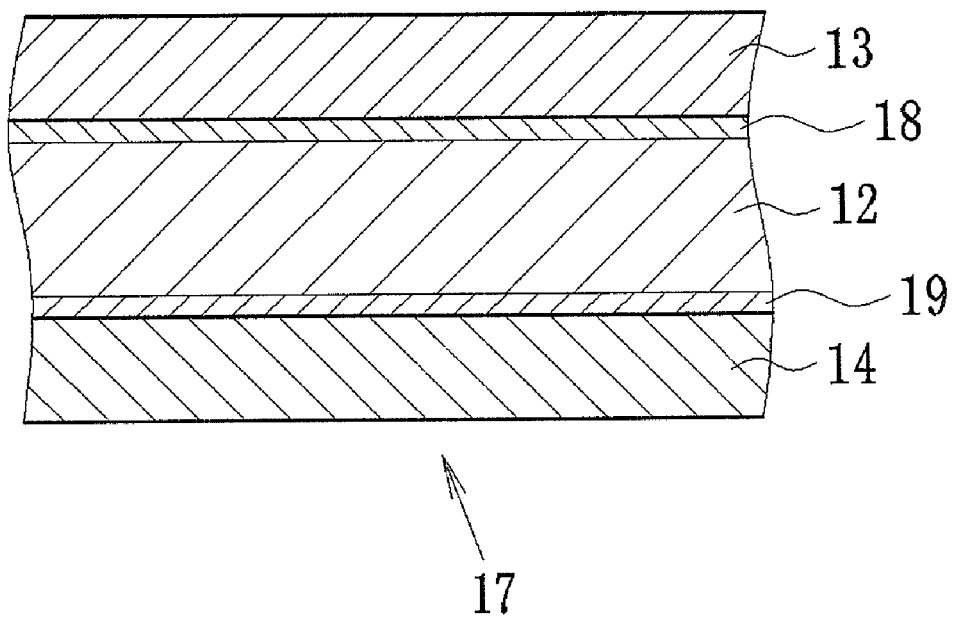
FIG. 1B is a cross section illustrating another multi-layer waste film.

In FIGS. 1A and 1B, examples of multi-layer waste films as raw materials are illustrated. Common reference numerals are used between those drawings. A multi-layer waste film 11 of FIG. 1A includes a PVA layer 12 and cellulose ester layers 13 and 14 of cellulose acylate. The PVA layer 12 is formed from polyvinyl alcohol. The cellulose ester layers 13 and 14 are overlaid on respectively surfaces of the PVA layer 12. Each of the PVA layer 12, the cellulose ester layers 13 and 14 is an element originally produced as a single layer film product of PVA or cellulose ester. The multi-layer waste film 11 is formed by attaching those together in adhesion. The producing method of the PVA film and cellulose ester film for use in the present invention is not limited.

Iodine may be contained in the PVA layer 12 as additive for use in a polarizing plate.

Acylates of cellulose for the cellulose ester layers 13 and 14 are preferably acetates. Cellulose acylates as a main component of the film are cellulose triacetate (TAC) and also can be cellulose diacetate (DAC), and the like. The degree of substitution of the acyl groups in cellulose acylate is not limited particularly.

The cellulose ester layers 13 and 14 are basically the same as those contained in the single layer waste film. Also, each of the cellulose ester layers 13 and 14 may contain various compounds such as plasticizers, ultraviolet (UV) absorbers, deterioration inhibitors, retardation control agents, dyes, mat agents, release agents, stripping accelerators, and other additives. The cellulose acylates of the invention may contain any of those additives. The cellulose ester layer 14 may have components and a ratio of composition of those in an equal manner to the cellulose ester layer 13, and may have components and a ratio of composition of those in a different manner from the cellulose ester layer 13. Cellulose acylate may be different between the cellulose ester layers 13 and 14 in relation to examples of acyl groups and substitution degree of the acyl groups.

Details of cellulose acylates are according to various relevant techniques suggested in JP-A 2005-104148. Those examples and their various features can be used in the present invention. Uses of various materials in relation to the polymer are suggested in JP-A 2005-104148, including solvents, plasticizers, deterioration inhibitors, ultraviolet (UV) absorbers, lubricants, optical anisotropy control agents, retardation control agents, dyes, mat agents, release agents, stripping accelerators, and other additives. The cellulose acylates of the invention may contain any of those additives.

In FIG. 1B, a multi-layer waste film 17 is illustrated. An adhesive layer 18 is disposed between the cellulose ester layer 13 and the PVA layer 12. An adhesive layer 19 is disposed between the cellulose ester layer 14 and the PVA layer 12. Both of those operate for firm adhesion of the layers.

When the multi-layer waste films 11 and 17 are used as polarizing plate, the PVA layer 12 is a polarizing element. The cellulose ester layers 13 and 14 are protective layers for protecting the polarizing element. Examples of the multi-layer waste films 11 and 17 for activated carbon include remaining portions after cutting portions of polarizing plates from a continuous multi-layer film which includes a PVA layer and first and second cellulose acylate layers, and also defective portions derived from produced polarizing plates according to quality inspection, and the like. An example in the embodiment is the use of the multi-layer waste films 11 and 17 in layer structure of PVA and cellulose acylate as raw material of activated carbon. However, the invention is not limited to this structure. Forms of raw material for activated carbon are not limited to the film form with a small thickness. Examples of forms of raw material are a ribbon shape, a sheet shape, and a strip shape and a mixture of those, and pellets, granules and powder. Activated carbon may be produced from various waste materials used for producing polarizing plates.

Figure 2:
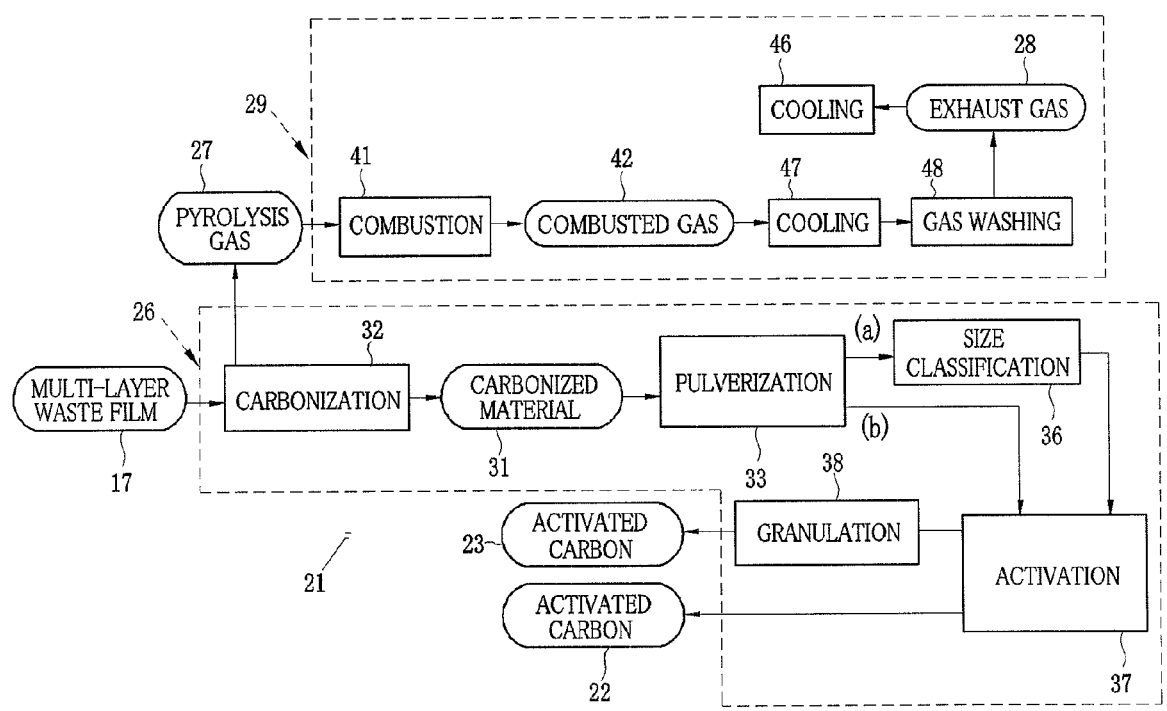
FIG. 2 is an explanatory view illustrating a flow of an activated carbon producing method.

In FIG. 2, steps of an activated carbon producing method are illustrated. In the description hereafter, the multi-layer waste film 17 is used as raw material, as the producing method is common between the multi-layer waste films 11 and 17 as raw material. Details of the steps will be described by referring to other drawings. A system for an activated carbon producing method 21 includes a first flow line 26 and a second flow line 29. The first flow line 26 produces activated carbon 22 and 23 from the multi-layer waste film 17. The second flow line 29 processes pyrolysis gas 27 from the first flow line 26 to produce exhaust gas 28 which can be discharged to the atmosphere.

The first flow line 26 has sections for a carbonizing step 32 and a pulverizing step 33. In the carbonizing step 32, carbonized material 31 is produced by heating and carbonizing chips of the multi-layer waste film 17. In the pulverizing step 33, the carbonized material 31 is pulverized. A pulverizing method and target granule size of the pulverizing step 33 differ according to the carbonization in the carbonizing step 32. There are two flows defined to follow the pulverizing step 33 and indicated by the arrows a and b in FIG. 2.

There is considerable irregularity in the granule diameter of the carbonized material 31 obtained in the pulverizing step 33. In other words, distribution of the granule diameter is very large. To obtain the carbonized material 31 with very high hardness in the carbonizing step 32, a size classifying step 36 is additionally used in the flow (a) for classifying the carbonized material 31 according to the granule diameter. Then an activating step 37 is supplied with the carbonized material 31 after size classification in the size classifying step 36 for plural ranges of the granule diameter, to obtain the activated carbon 22 by activation.

If the carbonizing step 32 is carried out without considering the hardness of the carbonized material 31 to be obtained, the carbonized material 31 is pulverized in the pulverizing step 33 at a regular diameter. After this, the carbonized material 31 of the granular or powdered form is activated in the activating step 37 to obtain a product. The product of the activation is usable as activated carbon, but may have insufficient hardness or insufficient granule diameter according to various purposes of the use. It is preferable for such purposes to add a granulation step 38, which forms the product of the activation into granules of desired hardness and granule diameter in the form of the activated carbon 23. The speed of activation can be more uniform according to the degree of being uniform of granules of the carbonized material 31. A product of the activation can be obtained with a high yield. Note that the size classifying step 36 may be added in the flow line (b) in the manner similar to the flow line (a) for the purpose of making uniform the granule diameter of the carbonized material 31 to be activated.

If the cellulose acylate in the multi-layer waste film 17 is cellulose acetate, the pyrolysis gas 27 of acetic acid $CH_3COOH$ is produced in the carbonizing step 32 in the first flow line 26. As the multi-layer waste film 17 is derived from the polarizing plate production, iodine is contained in the PVA layer in the multi-layer waste film 17. Then in the carbonizing step 32, at least one of iodine and iodine oxides is created in addition to the acetic acid. Therefore, the pyrolysis gas 27 contains iodine or iodine oxides. In a combustion step 41 of the second flow line 29, acetic acid contained in the pyrolysis gas 27 is combusted to produce gaseous carbon dioxide $CO_2$ from carbon of the acetic acid. Carbon monoxide CO may be created. However, it is preferable to determine a combustion condition to oxidate carbon monoxide totally to produce gaseous carbon dioxide. Should iodine or iodine oxides be contained in the pyrolysis gas 27, chemical reaction or changes in the phase occur in the combustion step 41, for example reaction of iodine to produce iodine oxides, further oxidation of iodine oxides, and the like. For the gas created by the combustion step 41, a term of combusted gas 42 is used. If iodine is contained in the PVA layer, the combusted gas 42 contains iodine or iodine oxides together with gaseous carbon dioxide.

In a cooling step 47, the combusted gas 42 is cooled. In a gas washing step 48, the combusted gas 42 after the cooling step 47 is absorbed in alkaline solution. The pyrolysis gas 27 from the carbonizing step 32 is cleaned by removal of gaseous carbon dioxide, or removal of gaseous carbon dioxide, iodine and iodine oxides, so that the exhaust gas 28 is discharged in the atmosphere. In a cooling step 46, the exhaust gas 28 is preferably cooled before discharge in the atmosphere. Also, it is possible to clean the exhaust gas 28 to a higher extent by use of an adsorption device containing activated carbon before discharge in the atmosphere after cooling. If cellulose acylate in the multi-layer waste film 17 has an acyl group being different from the acetyl group, gas of carboxylic acid may be created in the carbonizing step 32, the carboxylic acid being other than acetic acid and being present instead of or in addition to acetic acid. However, such carboxylic acids can be oxidated also in the combustion step 41 to produce gaseous carbon dioxide.

Figure 3:
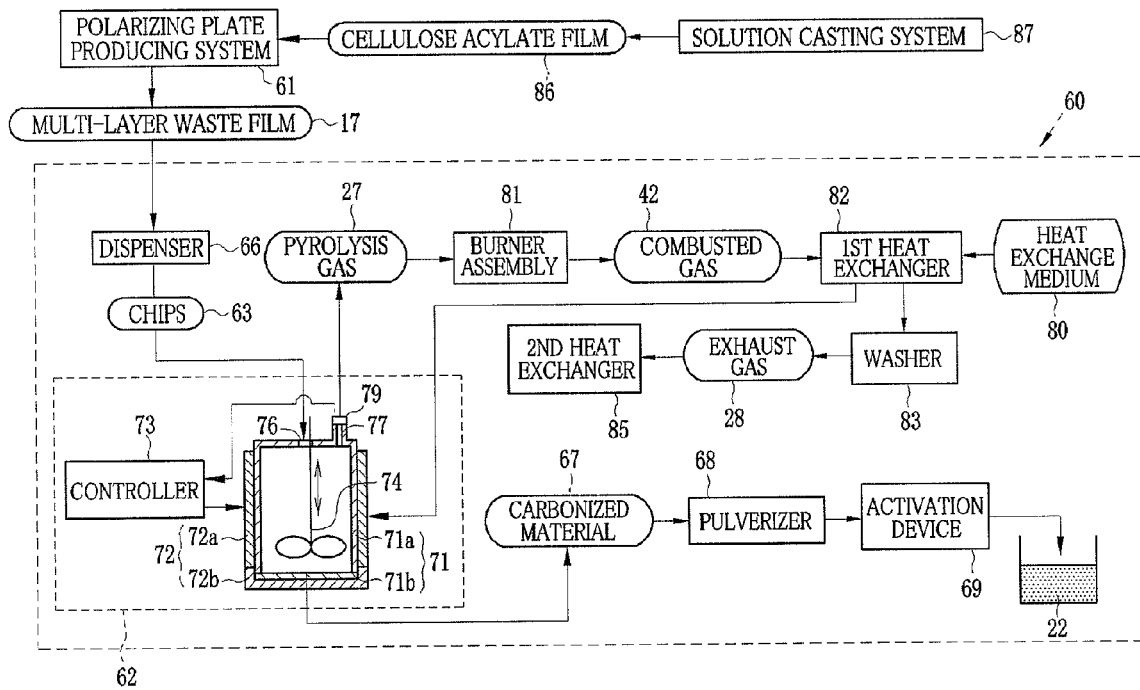
FIG. 3 is a block diagram illustrating an activated carbon producing system.
Figures 4A, 4B, 4C:
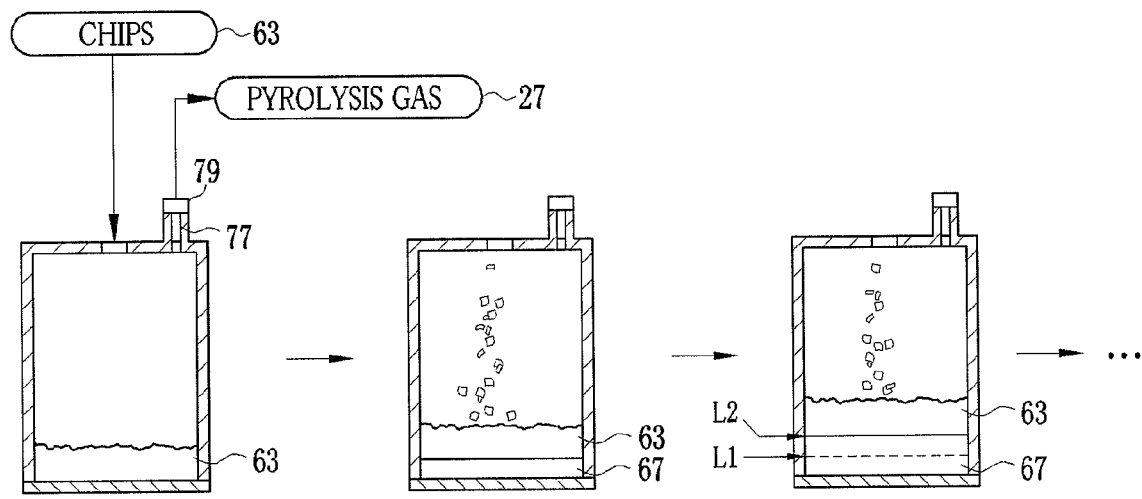
FIG. 4A is an explanatory view illustrating a state of a heating furnace in a first sequence of carbonization.
FIG. 4B is an explanatory view illustrating a state of the heating furnace in a supply period of a second sequence of carbonization.
FIG. 4C is an explanatory view illustrating a state of the heating furnace in a supply period of a third sequence of carbonization.

A method for the flow (a) is described now. In FIG. 3, an activated carbon producing system 60 is illustrated. In FIGS. 4A-4C, a carbonizer 62 is illustrated. The activated carbon producing system 60 includes a dispenser 66, the carbonizer 62, a pulverizer 68, and an activation device 69. The dispenser 66 forms chips 63 by cutting the multi-layer waste film 17 as raw material from a polarizing plate producing system 61. The carbonizer 62 carbonizes the chips 63 from the dispenser 66 to obtain carbonized material 67. The pulverizer 68 pulverizes the carbonized material 67 to form granules, which are classified by size classification. The activation device 69 activates the carbonized material 67 of granules to obtain the activated carbon 22. Carbonization in the present invention is pyrolysis to decompose carbonaceous material thermally to obtain a product generally constituted by carbon atoms.

The dispenser 66 includes a rotary cutter, hopper and batch feed mechanism (not shown). The rotary cutter has a blade. The hopper is disposed in an upstream end of the rotary cutter. The batch feed mechanism feeds the chips 63 from the rotary cutter toward the carbonizer 62.

The multi-layer waste film 17 is entered in the hopper, and transferred to the rotary cutter. There is no need of a predetermined form of the multi-layer waste film 17 before entry to the hopper. Examples of forms of the multi-layer waste film 17 are a ribbon shape, a sheet shape, and a strip shape and a mixture of those. The multi-layer waste film 17 is cut by the rotary cutter into the chips 63 of a nearly quadrilateral shape of 1 cm×1 cm. The batch feed mechanism is disposed downstream from the rotary cutter, and transfers the chips 63 to the carbonizer 62.

The carbonizer 62 includes a heating furnace 71, a heater/cooler 72 and a controller 73. The heating furnace 71 is supplied with the chips 63 to carbonize. The heater/cooler 72 heats and cools the inside of the heating furnace 71 for keeping a constant inner temperature. The controller 73 controls the heater/cooler 72 for the temperature.

The heating furnace 71 includes a furnace lining 71a or furnace body and a furnace bottom 71b. The furnace lining 71a contains the chips 63. The furnace bottom 71b is secured to the edge of the furnace lining 71a in a removable manner. A supply opening 76 and an exit opening 77 are formed in an upper side of the furnace lining 71a. The supply opening 76 is openable and adapted for feeding the chips 63. The exit opening 77 is openable, and exhausts the gas within the furnace lining 71a. A density sensor 79 is disposed at the exit opening 77 for detecting density of acetic acid $CH_3COOH$ in the pyrolysis gas 27. The density sensor 79 sends a signal to the controller 73 as a result of detecting the density or gas pressure at the exit opening 77. In response to the signal, the controller 73 turns on or off the heating of the heater/cooler 72, or adjusts the target temperature. The heater/cooler 72 includes a first cover 72a and a removable second cover 72b. The first cover 72a covers the outside of the furnace lining 71a. The second cover 72b is removably positioned on the first cover 72a at the time of removal of the furnace bottom 71b from the furnace lining 71a. A mixer 74 may be disposed inside the furnace lining 71a for stirring the chips 63 during the heating. The carbonization can be carried out efficiently and uniformly. In FIG. 4, the mixer 74 is not illustrated for the purpose of simplicity.

The chips 63 are carbonized not in a collective manner but in batches of a divided manner. In a plurality of sequences, the chips 63 are fed in batches, and then carbonized each time after the supply. In the present description, a term of a supply period is used as a first period of supply of the chips 63 to the furnace lining 71a. A term of a decomposing period is used as a second period of decomposing the chips 63 for carbonization after the supply. Specifically, a first batch of the chips 63 is fed in the furnace lining 71a as first supply. Before the completion of the carbonization of the chips 63 of the first supply, a second batch of the chips 63 is fed in the furnace lining 71a with the carbonized material 31 formed by the first supply.

The following is a specific example of the carbonization including two periods. In FIG. 4A, part of the chips 63 to be carbonized is supplied to the heating furnace 71. This is a supply period of the first sequence.

Then in the decomposing period of the first sequence, the chips 63 of the first supply are carbonized. It is preferable to stir the chips 63 by rotation of the mixer 74 in FIG. 3. The chips 63 are heated and decomposed, to carbonize the PVA, cellulose acylate and adhesive agent by thermal decomposition. The cellulose acylate decomposes in the chips 63. At the start of the decomposition, acetic acid is created in a gas phase. The exit opening 77 is kept open in the decomposing period, to draw the pyrolysis gas 27 containing the gaseous acetic acid. If iodine, iodine ion and iodine oxides are created, any of those is drawn with the gaseous acetic acid in the pyrolysis gas 27.

At the exit opening 77, density of acetic acid in the pyrolysis gas 27 is detected continuously by the density sensor 79, to send a detection signal to the controller 73. The acetic acid density at first increases gradually after the start of carbonizing the first supply, and then comes to its peak, and then decreases gradually. If the acetic acid density remains low without rise over a predetermined level, then the controller 73 preferably can control the heater/cooler 72 to set the target temperature higher. This is effective in promoting decomposition to carry out carbonization efficiently. Thus, it is preferable in view of efficiency to start the supply period of the second sequence after peaking of the acetic acid density and before reach of the acetic acid density to zero. In short, it is preferable to terminate the decomposing period of the first sequence before completion of the carbonization. The end of the decomposing period of the first sequence can be determined according to an amount of acetic acid obtained per unit time, or more simply, according to the acetic acid density. When the acetic acid density comes up to its peak and then decreases to become equal to or lower than a predetermined value, then the batch feed mechanism of the dispenser 66 can operate to feed the chips 63 for next supply period in response to a signal from the density sensor 79.

It is specifically preferable to set the acetic acid density at the start of the supply period of the second sequence approximately 60% as high as a peak of the acetic acid density in the decomposing period of the first sequence. The supply period of an Nth sequence can be preferably started when the acetic acid density becomes $60/100$ as high as a peak of the acetic acid density in the decomposing period of the (N−1)th sequence.

The carbonization in the decomposing period as decomposition is exothermic reaction, which generates heat. The acetic acid density is proportional to a heat amount. The acetic acid density increases at the same time as the heat amount increases. The acetic acid density decreases at the same time as the heat amount decreases. A start time of the supply period of the second sequence can be determined according to the detected temperature by monitoring changes in the temperature of the heating furnace 71 even without use of the density sensor 79. Thus, the start time of the supply period of an Nth sequence can be obtained according to the acetic acid density or temperature of the heating furnace 71 in the decomposing period of an (N−1)th sequence, where N is an integer of 2 or more. Specifically, the start time of the supply period of the second or third sequence can be obtained according to the acetic acid density or temperature of the heating furnace 71 in the decomposing period of respectively the first or second sequence.

In the supply period of the second sequence, as illustrated in FIG. 4B, the chips 63 of the second supply are newly supplied on the carbonized material 67 obtained by the decomposing period of the first sequence. It is preferable that an amount of the second supply is so high as to cause fluidized cellulose acylate to permeate pores in the carbonized material 67 upon decomposing the second supply in the decomposing period of the second sequence, the batch of the carbonized material 67 being created earlier by the decomposing period of the first sequence. Note that pores in the carbonized material 67 are created by fine bubbles upon production of acetic acid in the decomposing period for the first sequence.

The chips 63 of the second supply are carbonized after the supply period of the second sequence. When the carbonized material 67 formed from the decomposing period of the first sequence is permeated with fluid of fluidized cellulose acylate, then the carbonized material 67 becomes broken and contacted by the fluidized cellulose acylate. In application of heat, the chips 63 of the second supply are carbonized. The part of the carbonized material 67, which has been formed from the first supply and contacts the chips 63 of the second supply, is made harder than at the start of the decomposing period of the second sequence owing to the increase in the ratio of the carbon. In FIG. 4C, a broken line L1 indicates a level of the carbonized material 67 obtained in the decomposing period of the first sequence. A broken line L2 indicates a level of the carbonized material 67 obtained in the decomposing period of the second sequence. Note that in FIGS. 4A-4C, the carbonized material 67 obtained in the decomposing period of the second sequence is positioned over that obtained in the decomposing period of the first sequence. However, part of the carbonized material 67 newly produced in the decomposing period of the second sequence is included in the carbonized material 67 obtained in the decomposing period of the first sequence. In FIG. 3, the mixer 74 is shiftable up and down. In the decomposing period of the second sequence, the mixer 74 should be adjusted and positioned to rotate within the carbonized material 67 formed from the first supply in addition to that formed from the second supply.

The supply period of the third sequence is started before the acetic acid density in the pyrolysis gas 27 in the decomposing period of the second sequence decreases to zero, which is in the same manner as the supply period of the second sequence. An amount of new part of the chips 63 in the supply period of the third sequence is determined so much as to be permeated with fluidized cellulose acylate upon decomposing the carbonized material 67 obtained by the decomposing period of the second sequence. Note that this is the smallest required amount. The new part of the chips 63 should be preferably so much as to permeate all of the obtained part of the carbonized material 67 with fluidized cellulose acylate. A part of the carbonized material 67 between the levels L1 and L2 is preferably contacted by the cellulose acylate fluidized in the decomposing period of the third sequence. A total of the carbonized material 67 of the level L2 or lower is preferably contacted by the cellulose acylate fluidized in the decomposing period of the third sequence. The mixer 74 of FIG. 3 is preferably disposed so as to rotate in the carbonized material 67 of the level L2 or lower, namely in at least a part of the carbonized material 67 created according to the second supply.

Thus, the carbonized material 67 upon being produced is permeated with the cellulose acylate fluidized in the decomposing period of a succeeding sequence, and consolidates so as to raise hardness of the carbonized material 67 or the activated carbon 22. It is preferable to repeat a sequence including the supply and decomposing periods.

In heating of the chips 63 in the decomposing period, the inner temperature of the heating furnace 71 is adjusted by the heater/cooler 72 in a range equal to or higher than 300 deg. C., preferably in a range equal to or higher than 350 deg. C. and equal to or lower than 600 deg. C., and desirably in a range equal to or higher than 400 deg. C. and equal to or lower than 600 deg. C. The time of the decomposing period is preferably equal to or more than 15 minutes and equal to or less than 60 minutes. The inner temperature of the heating furnace 71 and the amount of the chips 63 in the supply period can be adjusted for starting the supply period of a succeeding sequence. Should the time be shorter than 15 minutes for carbonization, the decomposition will be too quick and cause bubbles to emerge through the exit opening 77 of the heating furnace 71. Should the time be longer than 60 minutes for carbonization, the productivity will be considerably low.

The carbonized material 67, immediately after the carbonization of all of the amount, is in a temperature range of 300-600 deg. C. The carbonized material 67 at this time has a firmly solid form. Thus, the carbonized material 67 is cooled in a state positioned within the heating furnace 71, before the furnace bottom 71b is removed. The carbonized material 67 is crushed by access through a lower side of the heating furnace 71, and removed.

The pulverizer 68 includes a pulverizing mill and a classifier. The pulverizing mill pulverizes the carbonized material 67. The classifier classifies granules after pulverization of the carbonized material 67 for values of granule diameters. The pulverizing mill pulverizes the carbonized material 67 for a diameter equal to or less than a predetermined value. An average diameter of the pulverized granules of the carbonized material 67 is in a range equal to or more than 2 mm and equal to or less than 20 mm, preferably in a range of 2-15 mm, and desirably in a range of 2-10 mm. As a result of the pulverization, a mixture of granules with different diameters is obtained. In other words, the distribution of the granule diameter is large. It is preferable to classify the granules for each of plural ranges of the diameter. This is because there are suitable diameters of granules of the activated carbon 22 in compliance with its use and purpose. The classifier includes plural filters. A second one of the filters, which is disposed downstream from a first one of those, has numerous pores with a finer size than the first filter. The carbonized material 67 is classified by the plural ranges of the granule diameter.

Note that granules may be classified after the activating step, but preferably can be classified before the activating step, or both before and after the activating step. This is because the activation is effective and efficient according to the smallness of the distribution of the granule diameter. It is possible in the invention to form the granular activated carbon at a desired high hardness without use of binder and with a desired granule diameter. There are various advantages of the activated carbon of the invention. A first one of those lies in very small influence to the environment because of lack of coal tar or the like which has been used as a binder component of activated carbon. A second advantage lies in higher productivity than a known activated carbon producing method because of no need of a powdering step of powdering activated carbon and a granulation step of binding the powdered activated carbon with binder as additive. A third advantage lies in possibility of producing the granular activated carbon with a granule diameter comparatively suitable for any of purposes from cellulose acylate as raw material without a granulation step, in comparison with a known activated carbon producing method in which binder is used. The activated carbon can be produced not in a powdered form with an average particle diameter of several microns but in a granular form with an average particle diameter of several mm. The obtained activated carbon can have good handlability in containment in a chamber of an adsorption device. Bleeding of the activated carbon from an adsorption device can be prevented at the time of adsorption and desorption with steam. Also, a contact area of the activated carbon with an adsorbate can be very large to have high absorptivity, because a surface area of the activated carbon per unit volume is large.

The pyrolysis gas 27 drawn from the carbonizer 62 in the embodiment is processed in a gas processor (not shown) for the purpose of safe discharge in the atmosphere. The gas processor includes a burner assembly 81 and a first heat exchanger 82. The burner assembly 81 burns acetic acid, so as to produce a combusted gas 42. The first heat exchanger 82 cools the combusted gas 42 from the burner assembly 81. If iodine has been contained in the chips 63, the combusted gas 42 contains components of iodine and iodine oxides. A washer 83 is preferably used for washing the combusted gas 42 from the first heat exchanger 82. The washer 83 contains absorption solution for absorbing iodine or iodine oxides included in the combusted gas 42. A second heat exchanger 85 is preferably used for cooling the exhaust gas 28 from the washer 83 and gaseous carbon dioxide from the burner assembly 81. Also, a remover is preferably disposed downstream from the second heat exchanger 85 for adsorption or absorption of iodine or iodine oxides of a trace amount for removal.

The burner assembly 81 includes a combustion tower and a burner. The combustion tower is supplied with the pyrolysis gas 27 and burns the same. The burner is an auxiliary heat source for raising speed of burning the pyrolysis gas 27. Acetic acid is burnt at a temperature equal to or higher than 850 deg. C. and equal to or lower than 1,000 deg. C. upon supply of the pyrolysis gas 27. In the burning step, the acetic acid is oxidated sufficiently to produce gaseous carbon dioxide. In presence of iodine, iodine ion, iodine oxide as iodine components, oxidation of the components in the pyrolysis gas 27 also proceeds under the condition of oxidating the acetic acid in the above range of the temperature. Among iodine components, a compound with a highest content is likely to be $IO_4$. However, iodine components in relation to the present invention may be any of iodine compounds. Note that other substances are likely to be contained in the pyrolysis gas 27. Such substances, in case of containing carbon, react to produce gaseous carbon dioxide $CO_2$.

As the temperature of the combusted gas 42, which contains the gaseous carbon dioxide and iodine components, is 850-1,000 deg. C., the combusted gas 42 is cooled by the first heat exchanger 82 down to such a low temperature so as to enter the washer 83 in a normal condition. The first heat exchanger 82 includes a gas conduit (not shown) and an exchanger body (not shown). The gas conduit passes the combusted gas 42. The exchanger body is disposed about the gas conduit, and causes a heat exchange medium 80 to flow outside the gas conduit for heat exchange with the combusted gas 42. The heat exchange medium 80 circulates between the exchanger body, the heater/cooler 72 in the carbonizer 62, and the activation device 69. Heat is exchanged in the first heat exchanger 82 between the combusted gas 42 and the heat exchange medium 80, so that heat energy is transferred to at least one of the carbonizer 62 and the activation device 69. The cooled heat exchange medium 80 from the carbonizer 62 and cooled heat exchange medium 80 from the activation device 69 are used for cooling the combusted gas 42 in the first heat exchanger 82. Thus, it is possible to keep a low amount of energy to be used, as heat energy of the combusted gas 42 in the carbonization is circulated for use.

The washer 83 includes a container (not shown), a first pipe (not shown) and a second pipe (not shown). The container contains absorption solution for absorbing gaseous carbon dioxide and iodine components. The first pipe draws the combusted gas 42 to flow in the absorption solution in the container. The second pipe has a distal end positioned higher than a liquid surface in the container, and draws gas inside the container to flow to the outside of the washer 83. The first pipe has one end positioned in the absorption solution. The combusted gas 42 from the first heat exchanger 82 is drawn by the first pipe and bubbled in the absorption solution. Thus, the absorption solution is caused to absorb gaseous carbon dioxide and iodine components as components in the combusted gas 42. The absorption solution is alkaline solution. Preferable examples of the absorption solutions are an aqueous solution of sodium hydroxide, aqueous solution of potassium hydroxide and other alkaline aqueous solution well-known in the art. In use of the aqueous solution of sodium hydroxide or potassium hydroxide, a molar ratio of the sodium hydroxide or potassium hydroxide in the aqueous solution to the total molar number of the iodine component is preferably equal to or more than 1.1 and equal to or less than 1.5. If the molar ratio is less than 1.1, $I_2$ is very likely to liberate or release, due to low efficiency of the absorption. If the molar ratio is more than 1.5, an amount of the alkaline solution in use is likely to be very great. There is high danger in handling.

In another preferred washing method, first and second absorption solutions are used to wash the combusted gas 42. The first absorption solution absorbs gaseous carbon dioxide. The second absorption solution absorbs iodine components. A first reservoir contains the first absorption solution. A second reservoir is connected in series with the first reservoir, and contains the second absorption solution. One end of a pipe from the first reservoir is positioned in the second reservoir and submerged in the second absorption solution. The combusted gas 42 after passing in the first absorption solution can be introduced in the second absorption solution. In another preferred washing process, a scrubber well-known in the art is used in place of the liquid bath. An example of the scrubber is an absorption tower, which includes a gas inlet and a shower. The gas inlet is supplied with the combusted gas 42 at a suitable flow rate. The shower is disposed higher than the gas inlet, and supplies absorption solution as droplets. Also, scrubbers may be connected in series with one another, and wash the combusted gas 42 for plural times. The use of the plural absorption towers in series is preferable in comparison with the use of a single absorption tower, because load in the absorption in each of the absorption towers is reduced to raise the effect of washing.

The combusted gas 42 is cleaned by absorption of the gaseous carbon dioxide and iodine components, so that the exhaust gas 28 is obtained and discharged in the atmosphere. Also, the second heat exchanger 85 is supplied with the exhaust gas 28. Heat is exchanged between the exhaust gas 28 and a heat exchange medium or fluid in the second heat exchanger 85 for effectively utilizing the heat energy derived from the combusted gas 42. The heat exchange medium constitutes a heat energy source in the carbonizer 62 in a similar manner to the heat exchange medium in the first heat exchanger 82. This is effective in keeping low the amount of required energy in the activated carbon production. Furthermore, an adsorption device may be disposed downstream from the second heat exchanger 85 and contain adsorbent for iodine components. An example of the adsorption device is any of known adsorption towers in which activated carbon is contained as adsorbent and which include a blower for discharging the exhaust gas 28 after the adsorption. For the activated carbon to be used in the adsorption device, the activated carbon produced according to the present invention may be utilized.

In the present invention, the first and second heat exchangers 82 and 85 are also connected with a solution casting system 87, in which cellulose acylate film 86 is produced. Dry air is used in the solution casting system 87 for drying a cast film and polymer film, the cast film being dope cast on a support, the polymer film being stripped from the support. The dry air is blown to the cast film or polymer film directly, or is caused to flow in a casting chamber and a drying chamber for drying the polymer film. Temperature of the dry air is set higher than the room temperature normally. To this end, heat energy of heat exchange medium is used in the first and second heat exchangers 82 and 85. The dry air comes to contain solvent in the casting chamber and drying chamber, and is introduced to an adsorption tower containing adsorbent for adsorbing solvent. The solvent adsorbed by the adsorbent is desorbed with steam and recovered, and becomes reused as solvent for dope. In the present invention, heat energy of heat exchange medium in the first and second heat exchangers 82 and 85 is used for the purpose of creating steam for desorption. Also, the first and second heat exchangers 82 and 85 may be constituted by a heat exchanger installed in the solution casting system 87.

Figure 5:
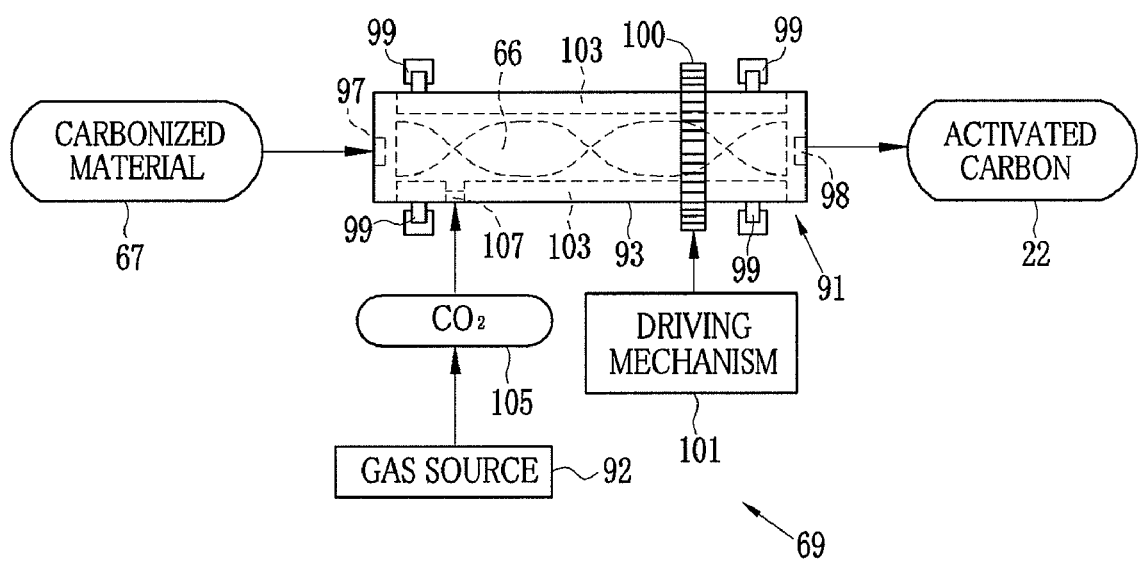
FIG. 5 is an explanatory view illustrating an activation device.

In FIG. 5, the activation device 69 is schematically illustrated. The activation device 69 includes a rotary kiln 91 and a gas source 92 for supplying gaseous medium into the rotary kiln 91. A kiln body 93 of the rotary kiln 91 has a pipe shape which is circular as viewed in the section. An inlet of the kiln body 93 receives the carbonized material 67. An outlet of the kiln body 93 causes the activated carbon 22 to exit. Shutters 97 and 98 are disposed to open and shut respectively the inlet and outlet. For the activation, the shutters 97 and 98 shut the inlet and outlet to enclose the inside of the rotary kiln 91 tightly.

Rollers 99 are disposed to support the kiln body 93 in a rotatable manner about its axis. A sprocket wheel 100 is disposed to project from the kiln body 93. A driving mechanism 101 is in mesh with the sprocket wheel 100 to rotate the kiln body 93. Mixing blades 106 are secured to the inside of the kiln body 93, and caused to rotate to stir the carbonized material 67 during flow in the downstream direction.

An electric heater 103 is disposed in the kiln body 93 to heat its inner space. A temperature sensor (not shown) is disposed in the kiln body 93 and detects its inner temperature. A controller (not shown) is disposed outside the kiln body 93, and controls the temperature according to the detected result of the temperature sensor.

The activation device 69 activates the carbonized material 67, and forms numerous fine pores to enlarge a total of a surface area of the carbonized material 67 over that before the activation. When the carbonized material 67 enters the kiln body 93, the mixing blades 106 rotate in the kiln body 93 and stir the carbonized material 67. An inner space of the kiln body 93 is heated by the electric heater 103, to apply heat to the carbonized material 67 at a predetermined level of the temperature.

In the kiln body 93, the temperature of the carbonized material 67 is preferably in a range equal to or higher than 750 deg. C. and equal to or lower than 950 deg. C. If the inner temperature of the kiln body 93 is regarded as the temperature of the carbonized material 67, the electric heater 103 can be adjusted for the temperature to control the inner temperature in this range. In the activating step with the kiln body 93, the carbonized material 67 is oxidated. Specifically, atoms or groups of atoms other than carbon atoms in the carbonized material 67 are oxidated and removed. Also, part of carbon atoms in the carbonized material 67 is oxidated and removed in forms of carbon dioxide or carbon monoxide. This forms fine pores in the carbonized material 67 with a small diameter, to obtain the activated carbon 22.

As the activating step is endothermic reaction which absorbs heat, necessary time is longer according to smallness in the heat energy per unit time for the purpose of applying predetermined heat energy to the carbonized material 67. Time for activating the carbonized material 67 is longer according to the lowness of the inner temperature of the kiln body 93. Should the temperature of the carbonized material 67 be lower than 750 deg. C., no activation occurs, so that the activated carbon 22 with absorptivity cannot be obtained. Should the temperature of the carbonized material 67 be higher than 950 deg. C., a manufacturing cost of the rotary kiln 91 will be extremely high. Among carbon atoms contained in the carbonized material 67, the number of carbon atoms to be removed in the oxidated form of carbon dioxide, carbon monoxide or the like may be too great. The yield of the activated carbon 22 will be lower according to the highness in the number of the carbon atoms to be removed. Also, a problem may arise in that a surface area of the activated carbon may be small and insufficient due to an unwanted enlarged diameter of pores. This being so, a suitable range of the temperature of the carbonized material 67 in the kiln body 93 is determined as described above.

Gaseous carbon dioxide 105 ($CO_2$) from the gas source 92 flows through a supply opening 107 or gas conduit into the kiln body 93. An amount of the gaseous carbon dioxide to supply depends upon the amount of the carbonized material 67. In other words, an amount of the gaseous carbon dioxide is higher according to highness of the amount of the carbonized material 67. Feeding of the gaseous carbon dioxide can be at the start of the activation, or throughout the period of the activation, or continually during the activation. The gas for the kiln body 93 is not limited to carbon dioxide, and can be oxidant gas which oxidates the carbonized material 67 by means of reduction of itself. Examples of oxidant gases include carbon dioxide, steam, air and the like and mixture of two or more of those.

Time of activation is adjusted so as to set the yield of the activated carbon 22 at 50%. The yield (%) of the activated carbon 22 is defined as 100×B/A where A is a weight of the carbonized material 67 for the activation, and B is a weight of the activated carbon obtained by the activation. Also, the time of activation can be adjusted also by performance of heating of the electric heater 103 and a rotational speed of the kiln body 93.

Activation of the carbonized material 67 in the activation device 69 removes unwanted extremely fine particles. The activated carbon 22 can have a very large surface area with the numerous fine pores. Absorptivity of the activated carbon 22 is much higher than that of the carbonized material 67. As the carbonized material 67 is activated while stirred by the rotary kiln 91, the activated carbon 22 can be produced efficiently even with absorptivity at a near level to that of well-known coconut shell activated carbon. After the activation, the shutter 98 in the kiln body 93 is opened to discharge the activated carbon 22. Note that the shutter 97 can be opened in the kiln body 93 for new supply of the carbonized material 67 for next operation.

In the present embodiment, the rotary kiln 91 is used for stirring the carbonized material 67 in the course of activation. However, other structures can be used for obtaining efficiency in the thermal conduction to the carbonized material 67 and its contact with the gaseous carbon dioxide 105. For example, gaseous oxidant can be blown into a container containing the carbonized material 67 for stir with the gas flow. Also, the container may be vibrated or shaken to stir the carbonized material 67.

According to the measurement of the above-described method, absorptivity for dichloromethane according to JIS K1474 is approximately 0.6 g/g. There occurs no degradation due to desorption with steam in the adsorption device in the solution casting system, and no degradation due to solvent. Note that the value of the absorptivity is in a weight (g) of the dichloromethane adsorbed per one gram of the activated carbon.

To produce activated carbon in the flow (b) of FIG. 2, a pulverizer (not shown) is positioned downstream from the activation device 69 in a manner similar to FIG. 5 for pulverizing activated product from the activation device 69. Activated carbon of a powdered form is obtained by the pulverizer. The product may be used as activated carbon, but also can be granulated in the granulation step of FIG. 2.

To granulate the activated carbon, a kneading pelletizing machine of a commercially available type (not shown) is used. The kneading pelletizing machine includes a kneader and a pelletizer as well-known in the art. A heater is associated with each of the kneader and the pelletizer to control the temperature discretely. The kneader is supplied with raw material, and mixes the raw material by shear in operation. The pelletizer is connected with the kneader, extrudes the mixed raw material with pressure for a size with a small diameter. A cutter at an end of the pelletizer cuts the mixed material in a pellet form.

The kneader is supplied with powdered activated carbon, cornstarch and water, to obtain the activated carbon 23 in a pellet form of FIG. 2. Also, a water emulsion of vinyl acetate may be used in place of cornstarch and water. The activated carbon 23 of the pellet form can be preferably dried sufficiently at 120 deg. C. or so.

The activated carbon produced in the above process can be used effectively as an adsorbent for adsorbing gaseous solvent evaporated in the solution casting system for cellulose ester film. Examples of gaseous solvent are dichloromethane and other volatile organic compounds.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An activated carbon producing method comprising:
   a carbonizing step of thermally decomposing multi-layer film including a polyvinyl alcohol layer and cellulose acylate layers formed on surfaces of said polyvinyl alcohol layer in a heating furnace, to produce carbonized material;
   an activating step of activating said carbonized material with heat, to produce activated carbon by forming fine pores therein;
   a combustion step of combusting carboxylic acid contained in pyrolysis gas created by thermal decomposition in said heating furnace, to produce gaseous carbon dioxide;
   a first heat exchange step of exchanging heat between said pyrolysis gas from said combustion step and heat exchange medium, to provide said heating furnace with said heat of said heat exchange medium; and
   a gas washing step of absorbing said gaseous carbon dioxide contained in said pyrolysis gas from said first heat exchange step by use of alkaline absorption solution.

2. An activated carbon producing method as defined in claim 1, wherein said multi-layer film is waste material created in producing a polarizing plate.

3. An activated carbon producing method as defined in claim 1, further comprising a second heat exchange step of exchanging heat between said pyrolysis gas from said gas washing step and heat exchange medium, to provide said heating furnace with said heat of said heat exchange medium.

4. An activated carbon producing method as defined in claim 1, further comprising:
   a pulverizing step of pulverizing said carbonized material from said carbonizing step, to supply granules having a diameter equal to or more than 2 mm and equal to or less than 20 mm;
   a size classifying step of classifying said granules in size classification for supply to said activating step.

5. An activated carbon producing method as defined in claim 1, further comprising:
   a pulverizing step of pulverizing said carbonized material from said carbonizing step, to supply said activating step with granules having a diameter equal to or more than 2 mm and equal to or less than 20 mm;
   a granulation step of forming granules with a greater diameter by use of said granules from said activating step.

6. An activated carbon producing method as defined in claim 1, further comprising a step of cutting said multi-layer film for supply to said heating furnace, to form chips.

7. An activated carbon producing method as defined in claim 1, wherein temperature of said heating furnace is equal to or higher than 300 deg. C. and equal to or lower than 600 deg. C.

* * * * *